(12) United States Patent
Suda

(10) Patent No.: US 8,722,283 B2
(45) Date of Patent: May 13, 2014

(54) FUEL CELL

(75) Inventor: Keisuke Suda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 631 days.

(21) Appl. No.: 12/949,804

(22) Filed: Nov. 19, 2010

(65) Prior Publication Data

US 2011/0123887 A1 May 26, 2011

(30) Foreign Application Priority Data

Nov. 25, 2009 (JP) .................................. 2009-267488

(51) Int. Cl.
*H01M 8/04* (2006.01)
*H01M 8/24* (2006.01)

(52) U.S. Cl.
USPC ............................. 429/514; 429/435; 429/457

(58) Field of Classification Search
None
See application file for complete search history.

(56) References Cited

U.S. PATENT DOCUMENTS

| | | | | |
|---|---|---|---|---|
| 2006/0204807 A1* | 9/2006 | Kosaka et al. | .................. | 429/26 |
| 2007/0117004 A1* | 5/2007 | Kikuchi et al. | ................. | 429/38 |
| 2008/0292930 A1* | 11/2008 | Oda et al. | ........................ | 429/26 |

FOREIGN PATENT DOCUMENTS

| JP | 2007-141552 | 6/2007 |
|---|---|---|
| JP | 2010-129249 | 6/2010 |

OTHER PUBLICATIONS

Japanese Office Action for corresponding JP Application No. 2009-267488, Mar. 5, 2012.

* cited by examiner

*Primary Examiner* — Barbara Gilliam
*Assistant Examiner* — Adam A Arciero
(74) *Attorney, Agent, or Firm* — Ditthavong Mori & Steiner, P.C.

(57) ABSTRACT

A fuel cell includes a stack of electrolyte electrode assemblies and metal separators. Each of the electrolyte electrode assemblies includes an electrolyte and a pair of electrodes sandwiching the electrolyte between the pair of electrodes. The fuel cell includes a coolant channel. The coolant channel is formed between the metal separators that are adjacent to each other to allow a coolant to flow through the coolant channel, and has grooves. The coolant channel includes an inclined coolant channel group in which overlapping portions of the grooves facing each other are connected along flow of the coolant that is oriented diagonally inward with respect to a longitudinal direction. The inclined coolant channel group includes inclined coolant channels whose downstream ends are connected to a downstream center of the coolant channel and whose upstream ends are connected to coolant inlet manifolds.

2 Claims, 7 Drawing Sheets

FUEL CELL

CROSS-REFERENCE TO RELATED APPLICATIONS

The present invention claims priority under 35 U.S.C. §119 to Japanese Patent Application No. 2009-267488, filed in the Japan Patent Office on Nov. 25, 2009, entitled "Fuel Cell", the entire contents of which are incorporated herein by reference.

BACKGROUND OF THE INVENTION

1. Field of the Invention

The present invention relates to a fuel cell.

2. Discussion of the Background

A solid polymer fuel cell includes unit cells. Each of the unit cells includes an electrolyte membrane electrode assembly (MEA) and a pair of separators sandwiching the MEA therebetween. The MEA includes an electrolyte membrane, which is a solid polymer ion-exchange membrane, and an anode electrode and a cathode electrode sandwiching the electrolyte membrane therebetween. The solid polymer fuel cell, which usually includes a certain number of stacked unit cells, is used as a fuel cell stack for an automobile.

In the above fuel cell, a fuel gas channel for supplying a fuel gas to the anode electrode is formed in a surface of one of the separators, and an oxidant gas channel for supplying an oxidant gas to the cathode electrode is formed in a surface of the other of the separators. Moreover, a coolant channel for supplying a coolant to an electrode area is formed between the separators of the fuel cells that are adjacent to each other.

As the separator, a metal separator may be used instead of a carbon separator, because a thin separator can be easily made by using a metal. In such a case, a thin metal plate is press forming so as to form channel grooves having a wave shape. By selectively using the channel grooves as a fuel gas channel or an oxidant gas channel, either an anode separator or a cathode separator can be made.

Grooves formed on the back side of the fuel gas channel are superposed on grooves formed on the back side of the oxidant gas channel, and thereby a coolant channel is formed between the anode separator and the cathode separator, which are adjacent to each other.

Japanese Unexamined Patent Application Publication No. 2007-141552, for example, describes a fuel cell stack of this type. FIG. 7 illustrates a unit cell 1 of the fuel cell stack. The unit cell 1 includes a membrane electrode assembly 2 and separators 3 and 4 that sandwich the membrane electrode assembly 2 therebetween.

A fuel gas inlet manifold 5a and an oxidant gas inlet manifold 6a extend through the upper end portion of the unit cell 1 in the stacking direction. A fuel gas outlet manifold 5b and an oxidant gas outlet manifold 6b extend through the lower end portion of the unit cell 1 in the stacking direction. Four cooling water inlet manifolds 7a and four cooling water outlet manifolds 7b are arranged in the vertical direction in lateral end portions of the unit cell 1.

Fuel gas channels 8a having a wave shape are formed in a surface of the separator 3 that faces the membrane electrode assembly 2. The fuel gas channels 8a are connected to the fuel gas inlet manifold 5a and the fuel gas outlet manifold 5b and extend in the longitudinal direction. Oxidant gas channels 9a having a wave shape are formed in a surface of the separator 4 that faces the membrane electrode assembly 2. The oxidant gas channels 9a are connected to the oxidant gas inlet manifold 6a and the oxidant gas outlet manifold 6b and extend in the longitudinal direction.

When the unit cells 1 are stacked on top of each other, a cooling water channel is formed between the separator 3 of one of the unit cells 1 and the separator 4 of an adjacent unit cell 1. The cooling water channel is formed because grooves 8b formed on the back side of the fuel gas channels 8a is superposed on grooves 9b formed on the back side of the oxidant gas channels 9a. The cooling water channel allows a coolant to flow in the lateral direction (horizontal direction) and connects the cooling water inlet manifold 7a to the cooling water outlet manifold 7b.

In a fuel cell, the flow directions of cooling water, fuel gas, and oxidant gas may be set to be substantially the same. For example, in the unit cell 1, the cooling water outlet manifolds 7b may be interchanged with the cooling water inlet manifolds 7a, and a pair of cooling water inlet manifolds 7a may be formed in the upper part of the unit cell 1 on either side and a pair of cooling water outlet manifolds 7b may be formed in the lower part of the unit cell 1 on either side.

Because the grooves 8b and 9b meander in wave shapes, channels through which cooling water can flow in the horizontal and vertical directions are formed between the grooves 8b and 9b. Thus, a so-called "H-flow" is formed in the sense that the cooling water is introduced through the pair of cooling water inlet manifolds 7a oppositely inward in the lateral direction, the cooling water flows vertically downward, flows outward in the lateral direction, and is discharged from the pair of cooling water outlet manifolds 7b.

However, in the cooling water channel, after flows of the cooling water join at a part in which the grooves 8b and 9b overlap each other, the flow direction of the cooling water is easily changed. Thus, the cooling water flows diagonally inward with respect to the longitudinal direction as indicated by two-dot chain line arrows. Moreover, flows of the cooling water from both sides collide near the central part CP in the longitudinal direction, and rebounding of the cooling water easily occurs. Thus, in particular, a hot spot HS, to which the cooling water is not sufficiently supplied, is generated at the center of the lower end of the cooling water channel. As a result, a problem arises in that the temperature distribution in the electricity-generating surface becomes nonuniform.

SUMMARY OF THE INVENTION

According to one aspect of the present invention, a fuel cell includes a stack of electrolyte electrode assemblies and metal separators. Each of the electrolyte electrode assemblies includes an electrolyte and a pair of electrodes sandwiching the electrolyte between the pair of electrodes. Each of the metal separators has a rectangular shape. Each of the metal separators has a fuel gas inlet manifold and an oxidant gas inlet manifold formed at one end of each of the metal separators in a longitudinal direction. The fuel gas inlet manifold and the oxidant gas inlet manifold respectively allow a fuel gas and an oxidant gas before use to flow in a stacking direction. A fuel gas outlet manifold and an oxidant gas outlet manifold are formed at another end of each of the metal separators in the longitudinal direction. The fuel gas outlet manifold and the oxidant gas outlet manifold respectively allow the fuel gas and the oxidant gas after use to flow in the stacking direction. A pair of coolant inlet manifolds and a pair of coolant outlet manifolds are formed at both ends of each of the metal separators in a lateral direction. The pair of coolant inlet manifolds are disposed adjacent to the fuel gas inlet manifold and the oxidant gas inlet manifold and allow a coolant before use to flow in the stacking direction. The pair of coolant outlet manifolds are disposed adjacent to the fuel gas outlet manifold and the oxidant gas outlet manifold and allow the coolant after use to flow in the stacking direction. The fuel cell includes a fuel gas channel, an oxidant gas channel, and a coolant channel. The fuel gas channel has a wave shape formed in one surface of the metal separator so as to extend in the longitudinal direction. The one surface faces one electrode of the pair of electrodes of each of the electrolyte electrode assemblies. The fuel gas channel connects the fuel gas inlet manifold to the fuel gas outlet manifold. The oxidant gas channel has a wave shape formed in another surface of the metal separator so as to extend in the longitudinal direction. The other surface faces another electrode of the pair of electrodes of each of the electrolyte electrode assemblies. The oxidant gas channel connects the oxidant gas inlet manifold to the oxidant gas outlet manifold. The coolant channel is formed between the metal separators that are adjacent to each other to allow the coolant to flow through the coolant channel. The coolant channel has grooves formed on a back side of the fuel gas channel and grooves formed on a back side of the oxidant gas channel. The coolant channel comprises an inclined coolant channel group in which overlapping portions of the grooves facing each other are connected along flow of the coolant that is oriented diagonally inward with respect to the longitudinal direction. The inclined coolant channel group comprises inclined coolant channels whose downstream ends are connected to a downstream center of the coolant channel and whose upstream ends are connected to the coolant inlet manifolds.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
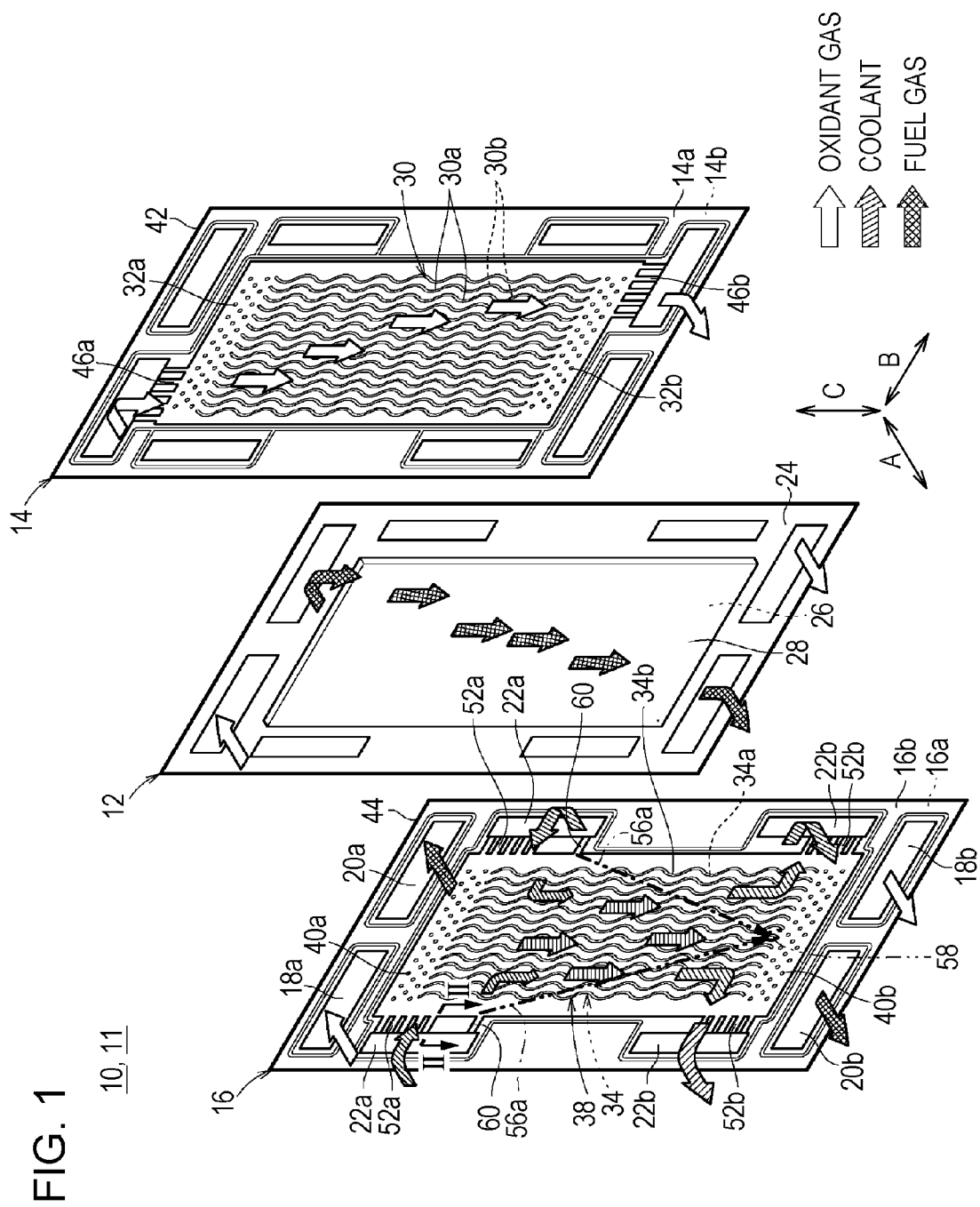
FIG. 1 is an exploded perspective view of a main part of a fuel cell according to an embodiment of the present invention.

The embodiments will now be described with reference to the accompanying drawings, wherein like reference numerals designate corresponding or identical elements throughout the various drawings.

Figure 2:
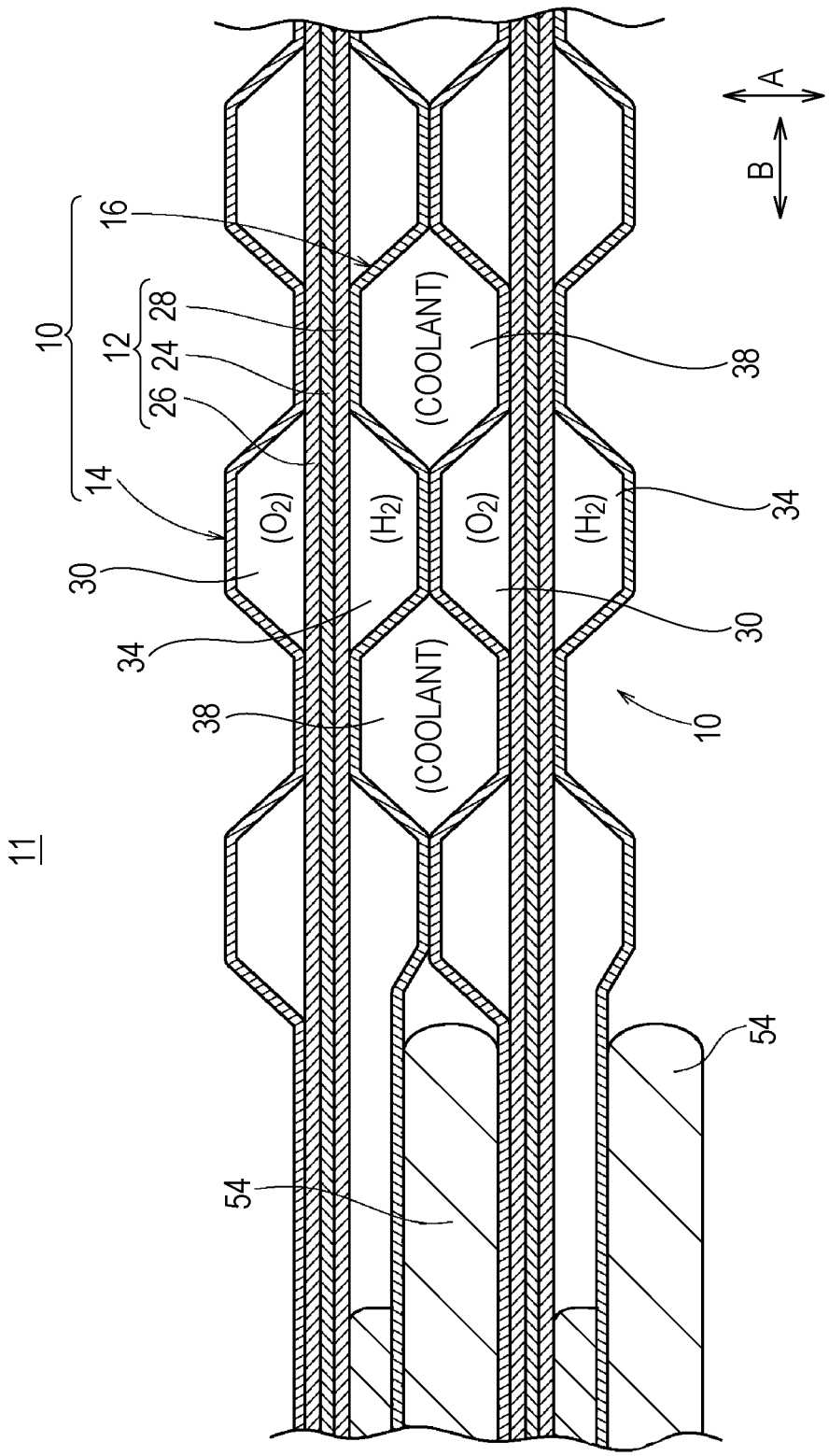
FIG. 2 is a sectional view of the fuel cell taken along line II-II of FIG. 1.

Referring to FIGS. 1 and 2, a plurality of fuel cells 10, each according to an embodiment of the present invention, are stacked in the direction of arrow A and constitute a fuel cell stack 11. The fuel cell 10 includes an electrolyte membrane electrode assembly 12 and first and second metal separators 14 and 16 that sandwich the electrolyte membrane electrode assembly 12 therebetween.

The first and second metal separators 14 and 16 are each made of, for example, a steel plate, a stainless steel plate, an aluminum plate, a galvanized steel plate, or a metal plate coated with anti-corrosive coating. The first and second metal separators 14 and 16 each have a rectangular shape in plan view and have protrusions and recesses in sectional view, which are formed by press forming a thin metal plate in wave shapes.

As illustrated in FIG. 1, the first and second metal separators 14 and 16 are disposed so that the long sides thereof extend in the direction of gravity (direction of arrow C) and the short sides thereof extend in the horizontal direction (direction of arrow B). (In other words, the fuel cells 10 are stacked in the horizontal direction.) Alternatively, the first and second metal separators 14 and 16 may be disposed so that the long sides thereof extend in the horizontal direction and the short sides thereof extend in the direction of gravity. As a further alternative, the separator surfaces may be parallel to the horizontal direction. (In other words, the fuel cells 10 may be stacked in the vertical direction.)

An oxidant gas inlet manifold 18a and a fuel gas inlet manifold 20a are formed near the upper corners of the fuel cell 10 in the longitudinal direction (direction of arrow C) so as to extend in the direction of arrow A. An oxidant gas, such as an oxygen-containing gas, is supplied through the oxidant gas inlet manifold 18a. A fuel gas, such as a hydrogen-containing gas, is supplied through the fuel gas inlet manifold 20a.

A fuel gas outlet manifold 20b and an oxidant gas outlet manifold 18b are formed near the lower corners of the fuel cell 10 in the longitudinal direction so as to extend in the direction of arrow A. The fuel gas is discharged through the fuel gas outlet manifold 20b. The oxidant gas is discharged through the oxidant gas outlet manifold 18b.

Two coolant inlet manifolds 22a are formed in the upper end portions of the fuel cell 10 in the lateral direction (direction of arrow B) so as to extend in the direction of arrow A. A coolant is supplied through the coolant inlet manifolds 22a. Two coolant outlet manifolds 22b are formed in the lower end portions of the fuel cell 10 in the lateral direction. The coolant is discharged through the coolant outlet manifolds 22b.

The electrolyte membrane electrode assembly 12 includes a solid-polymer electrolyte membrane 24, and a cathode electrode 26 and an anode electrode 28 that sandwich the solid polymer electrolyte membrane 24 therebetween. The solid-polymer electrolyte membrane 24 is, for example, a thin film made of perfluorosufonate polymer that is impregnated with water.

The cathode electrode 26 and the anode electrode 28 each include a gas diffusion layer (not shown) and an electrode catalyst layer (not shown). The gas diffusion layer is made of carbon paper or the like. The electrode catalyst layer is made by uniformly coating a surface of the gas diffusion layer with porous carbon particles whose surfaces support a platinum alloy. The electrode catalyst layer is formed on both sides of the solid polymer electrolyte membrane 24.

An oxidant gas channel 30 is formed in a surface 14a of the first metal separator 14 that faces the electrolyte membrane electrode assembly 12 so as to connect the oxidant gas inlet manifold 18a to the oxidant gas outlet manifold 18b. The oxidant gas channel 30 is formed between wave-shaped protrusions 30a that extend in the direction of arrow C. An inlet buffer portion 32a and an outlet buffer portion 32b, each having embossed protrusions, are respectively disposed near the inlet and the outlet of the oxidant gas channel 30.

Figure 3:
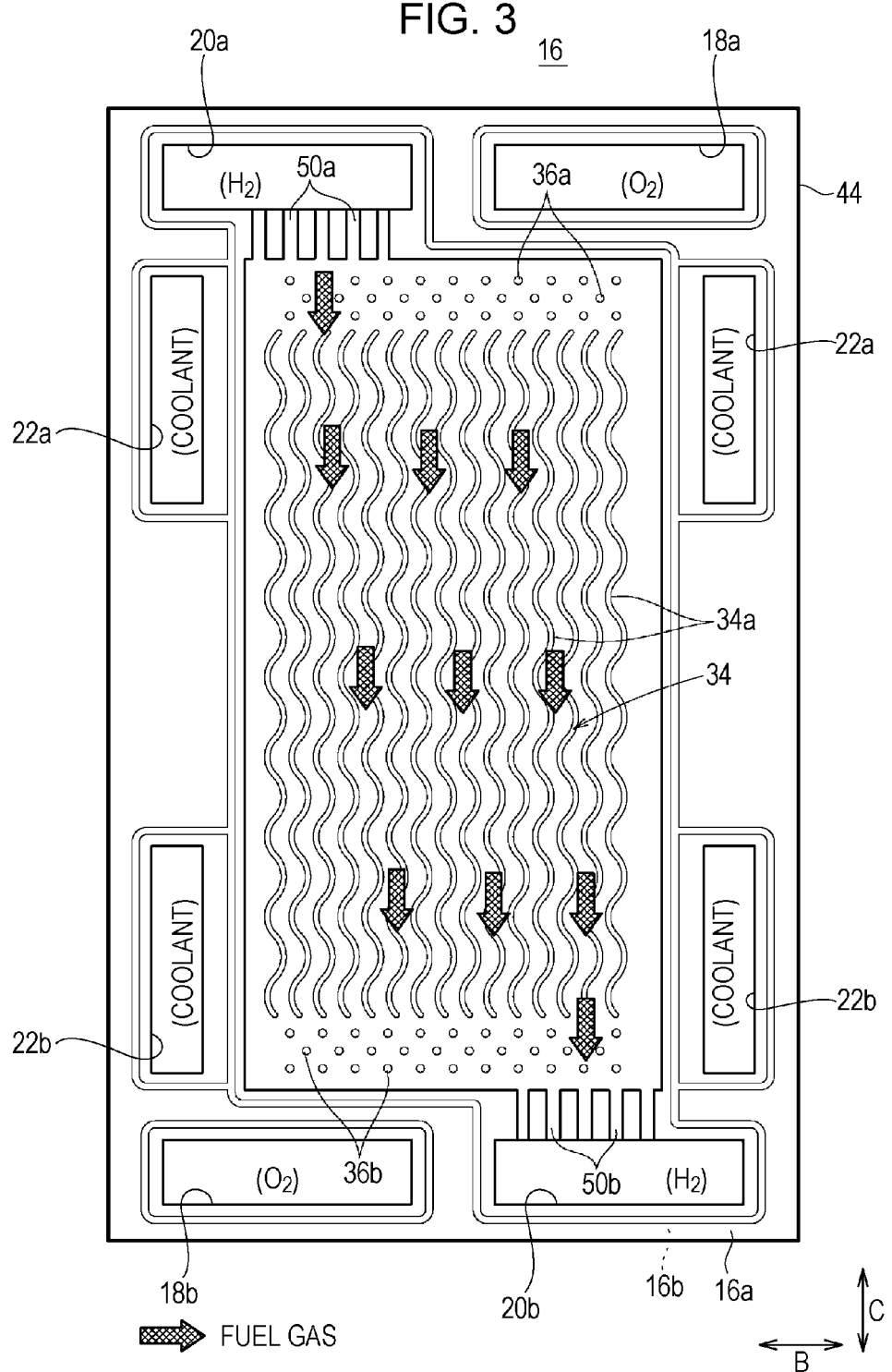
FIG. 3 is a plan view of one side of a second metal separator of the fuel cell.

As illustrated in FIG. 3, a fuel gas channel 34 is formed in a surface 16a of the second metal separator 16 that faces the electrolyte membrane electrode assembly 12 so as to connect the fuel gas inlet manifold 20a to the fuel gas outlet manifold 20b. The fuel gas channel 34 is formed between wave-shaped protrusions 34a that extend in the direction of arrow C. An inlet buffer portion 36a and an outlet buffer portion 36b, each having embossed protrusions, are respectively disposed near the inlet and the outlet of the fuel gas channel 34.

Figure 4:
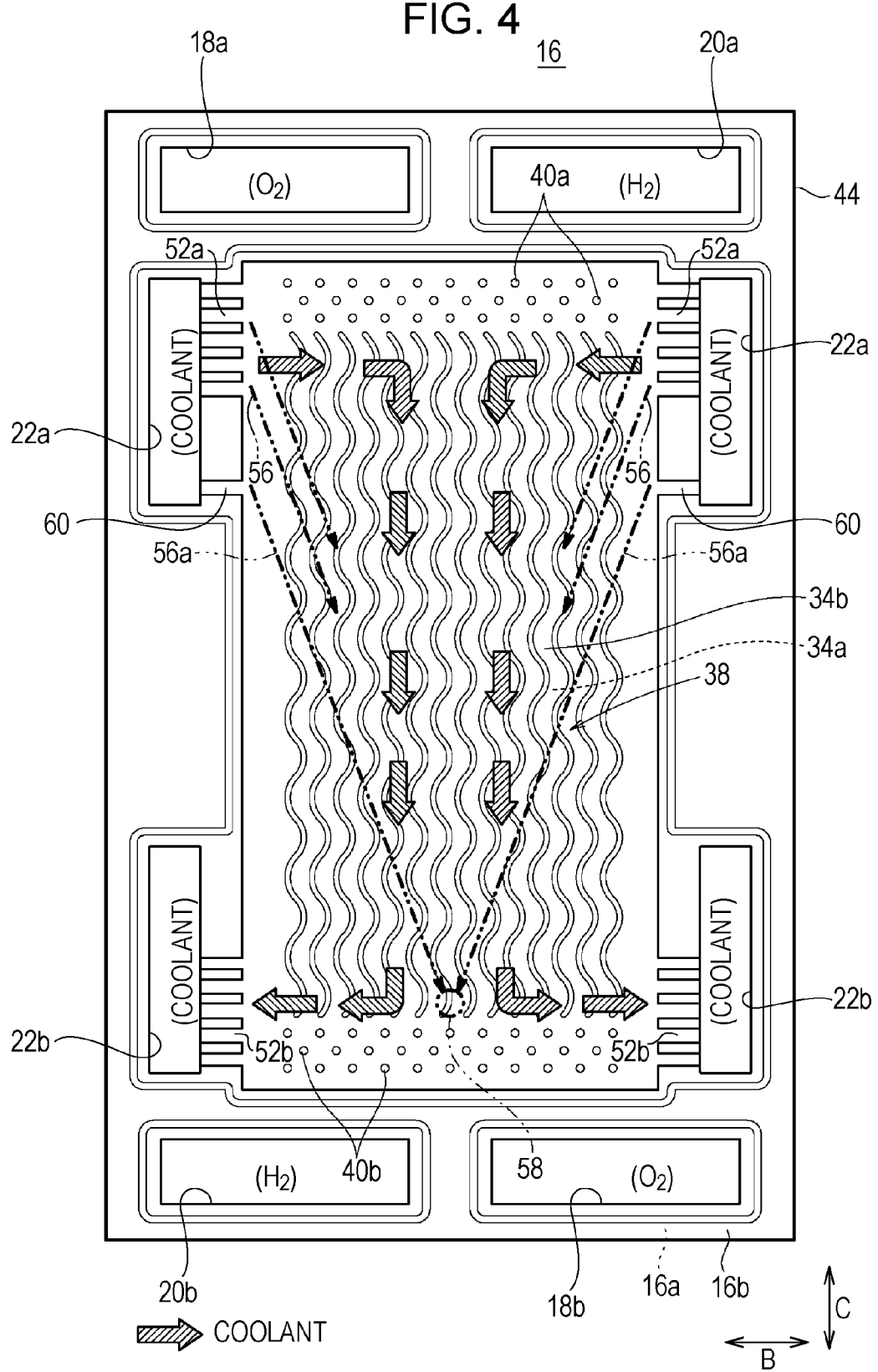
FIG. 4 is a plan view of the other side of the second metal separator.

A coolant channel 38 is formed between a surface 16b of the second metal separator 16 and a surface 14b of the first metal separator 14 so as to be connected to the coolant inlet manifolds 22a and the coolant outlet manifolds 22b (see FIGS. 1 and 4). Through the coolant channel 38, the coolant circulates around the electrode area of the electrolyte membrane electrode assembly 12.

Figure 5:
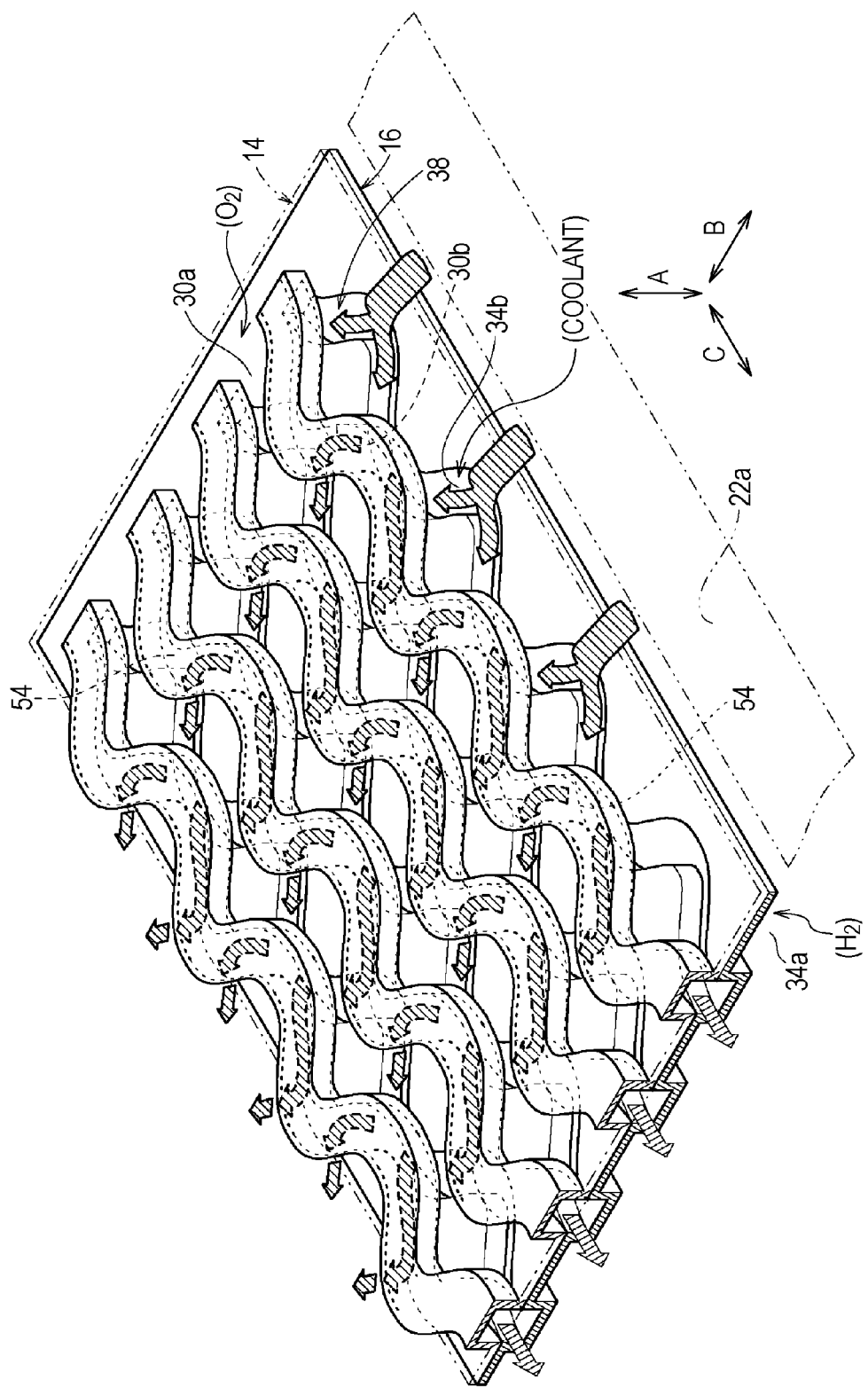
FIG. 5 is a perspective view of a main part of a coolant channel of the fuel cell.

As illustrated in FIGS. 1 and 5, the coolant channel 38 is formed by superposing grooves 30b, which are formed on the back side of the wave-shaped protrusions 30a that form the oxidant gas channel 30, and grooves 34b, which are formed on the back side of the wave-shaped protrusions 34a that form the fuel gas channel 34. An inlet buffer portion 40a and an outlet buffer portion 40b, each having embossed protrusions, are respectively disposed near the inlet and the outlet of the coolant channel 38 (see FIG. 4).

A first sealing member 42 is formed in one piece on the surfaces 14a and 14b of the first metal separator 14 so as to surround the outer edge of the first metal separator 14. A second sealing member 44 is formed in one piece on the surfaces 16a and 16b of the second metal separator 16 so as to surround the outer edge of the second metal separator 16. The first and second sealing members 42 and 44 may be made of, for example, a sealing material, a cushioning material, or a packing material, such as an EPDM, an NBR, a fluorocarbon rubber, a silicone rubber, a fluorosilicone rubber, a butyl rubber, a natural rubber, a styrene rubber, a chloroprene rubber, or an acrylic rubber.

As illustrated in FIG. 1, connection passages 46a are formed in the surface 14a of the first metal separator 14 by notching the first sealing member 42. The connection passages 46a connect the oxidant gas inlet manifold 18a to the oxidant gas channel 30. Connection passages 46b are formed in the surface 14a by notching the first sealing member 42 so as to connect the oxidant gas outlet manifold 18b to the oxidant gas channel 30.

As illustrated in FIG. 3, connection passages 50a are formed in the surface 16a of the second metal separator 16 by notching the second sealing member 44. The connection passages 50a connect the fuel gas inlet manifold 20a to the fuel gas channel 34. Connection passages 50b are formed in the surface 16a by notching the second sealing member 44. The connection passages 50b connect the fuel gas outlet manifold 20b to the fuel gas channel 34.

As illustrated in FIG. 4, connection passages 52a are formed in the surface 16b of the second metal separator 16 by notching the second sealing member 44. The connection passages 52a connect the pair of coolant inlet manifolds 22a to the coolant channel 38. Connection passages 52b are formed in the surface 16b of the second metal separator 16 by notching the second sealing member 44. The connection passages 52b connect the pair of coolant outlet manifolds 22b to the coolant channel 38.

Figure 6:
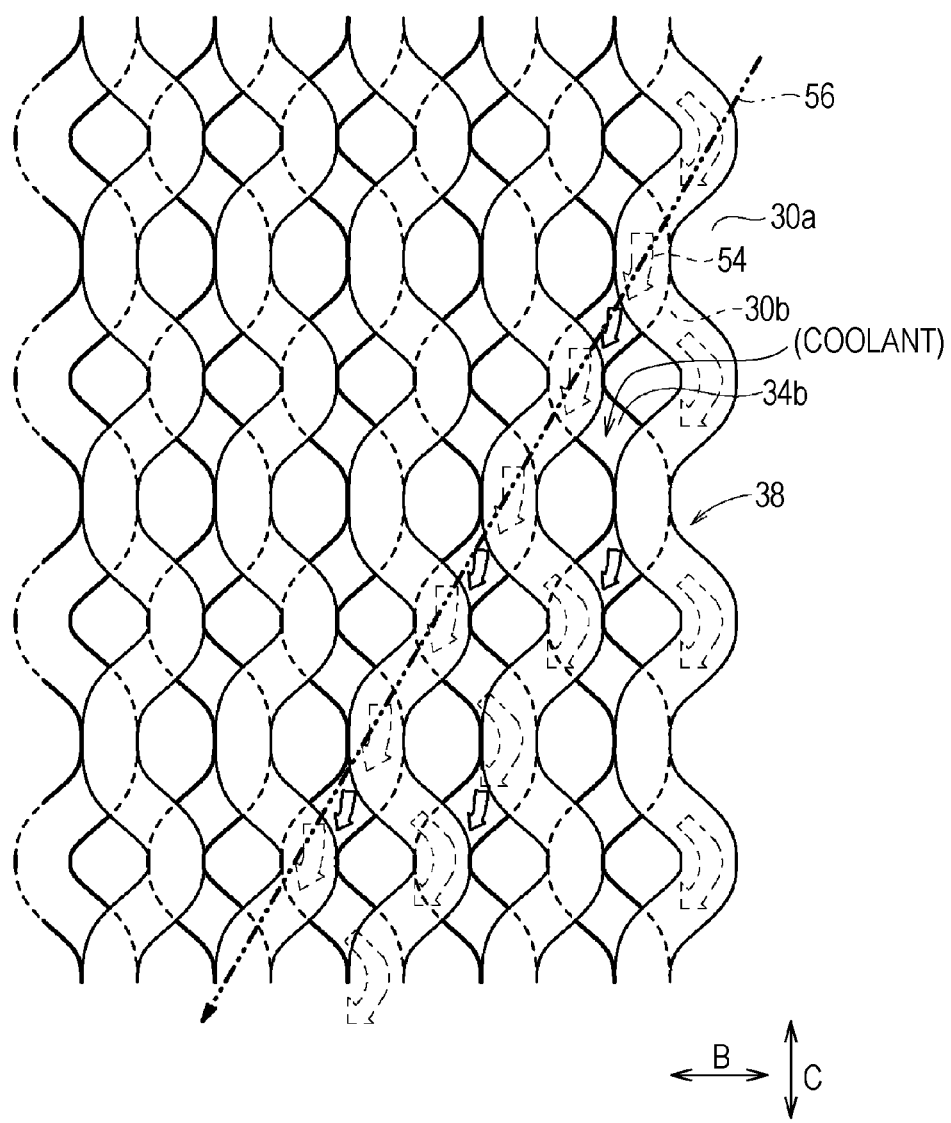
FIG. 6 is a plan view of the coolant channel.
Figure 7:
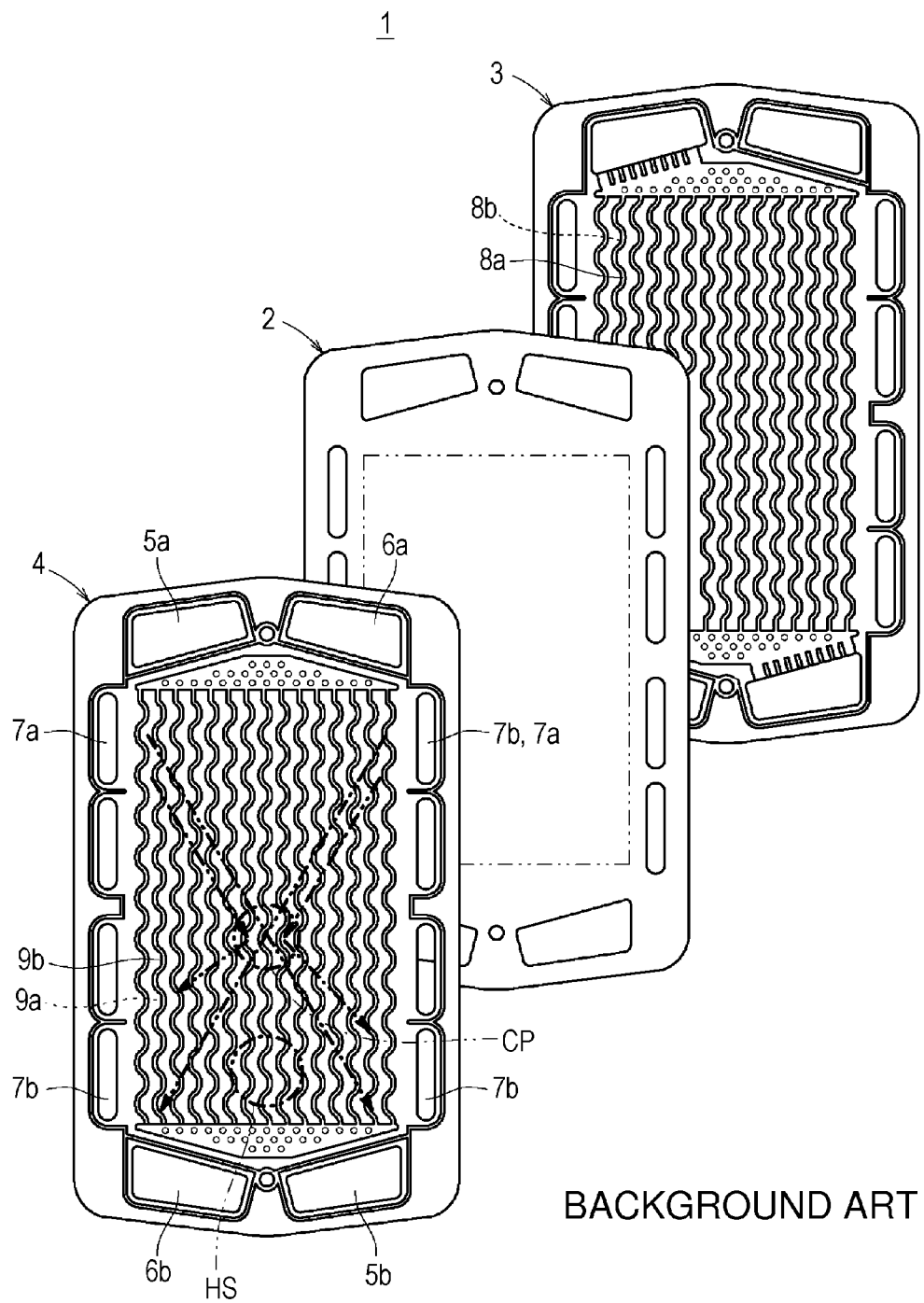
FIG. 7 is an exploded perspective view of a main part of a fuel cell stack described in Japanese Unexamined Patent Application Publication No. 2007-141552.

As illustrated in FIGS. 4 and 6, the coolant channel 38 includes an inclined coolant channel group 56 that is formed by connecting overlapping portions 54 of the grooves 30b and 34b that face each other in a direction of the flow of the coolant. The inclined coolant channel group 56 extends diagonally inward with respect to the longitudinal direction (direction of arrow C).

As illustrated in FIG. 4, the inclined coolant channel group 56 includes inclined coolant channels 56a whose downstream ends are connected to a downstream center 58 of the coolant channel 38 and whose upstream ends are connected to the coolant inlet manifolds 22a through connection passages 60. The connection passages 60 are formed below the connection passages 52a in the lower ends of the coolant inlet manifolds 22a.

Hereinafter, the operation of the fuel cell 10 will be described.

First, as illustrated in FIG. 1, an oxidant gas, such as an oxygen-containing gas, is supplied to the oxidant gas inlet manifold 18a. A fuel gas, such as a hydrogen-containing gas, is supplied to the fuel gas inlet manifold 20a. A coolant, such as pure water, ethylene glycol, or oil, is supplied to the pair of coolant inlet manifolds 22a.

The oxidant gas is introduced through the oxidant gas inlet manifold 18a to the oxidant gas channel 30 of the first metal separator 14. The oxidant gas flows through the oxidant gas channel 30 in the direction of arrow C (direction of gravity), and is supplied to the cathode electrode 26 of the electrolyte membrane electrode assembly 12.

The fuel gas is introduced through the fuel gas inlet manifold 20a to the fuel gas channel 34 of the second metal separator 16. As illustrated in FIG. 3, the fuel gas flows through the fuel gas channel 34 in the direction of gravity (direction of arrow C), and is supplied to the anode electrode 28 of the electrolyte membrane electrode assembly 12 (see FIGS. 1 and 2).

Consequently, the oxidant gas supplied to the cathode electrode 26 and the fuel gas supplied to the anode electrode 28 react with each other in the electrode catalyst layer of the electrolyte membrane electrode assembly 12, thereby generating electric power.

Next, the oxidant gas that has been supplied to the cathode electrode 26 of the electrolyte membrane electrode assembly 12 and that has been consumed is discharged through the oxidant gas outlet manifold 18b in the direction of arrow A. The fuel gas that has been supplied to the anode electrode 28 of the electrolyte membrane electrode assembly 12 and that has been consumed is discharged through the fuel gas outlet manifold 20b in the direction of arrow A.

As illustrated in FIG. 1, the coolant, which has been supplied to the pair of coolant inlet manifolds 22a, is introduced to the coolant channel 38 between the first metal separator 14 and the second metal separator 16. As illustrated in FIG. 4, the coolant temporarily flows inward in the direction of arrow B (horizontal direction), and flows in the direction of arrow C (direction of gravity) so as to cool the electrolyte membrane electrode assembly 12. Then, the coolant flows outward in the direction of arrow B, and is discharged through the pair of coolant outlet manifolds 22b.

In this case, the coolant channel 38 is formed by superposing the grooves 30b, which are formed on the back side of the wave-shaped protrusions 30a, and the grooves 34b, which are formed on the back side of the wave-shaped protrusions 34a. As a result, the coolant channel 38 includes the inclined coolant channel group 56 that is formed by connecting the overlapping portions 54 of the grooves 30b and 34b along the flow of the coolant oriented diagonally inward with respect to the longitudinal direction.

Therefore, as illustrated in FIG. 4, a part of the coolant, which has been introduced through the pair of coolant inlet manifolds 22a to the coolant channel 38, flows in the direction of arrow C, and another part of the coolant flows diagonally inward with respect to the longitudinal direction along the inclined coolant channel group 56.

In the present embodiment, the connection passages 60 are formed in the lower end of the coolant inlet manifolds 22a, and the inclined coolant channels 56a are formed so that the downstream ends thereof are connected to the downstream center 58 of the coolant channel 38 and the upstream ends thereof are connected to the coolant inlet manifolds 22a through the connection passages 60. Therefore, in particular, the downstream center 58 of the coolant channel 38, which is disposed downstream of the oxidant gas channel 30 and the fuel gas channel 34 and at which the temperature of the electricity-generating surface rises, can be reliably cooled. Moreover, parts of the coolant that flow through the inclined coolant channels 56a on the left and right sides collide with each other near the downstream center 58 and then rebound, whereby the coolant can be also supplied to the downstream center 58.

Thus, the temperature distribution in the electricity-generating surface can be made uniform over the entire area, whereby the electricity-generating performance of the fuel cell 10 can be increased.

In the present embodiment, the connection passages 60 that are connected to the coolant inlet manifolds 22a are disposed below the connection passages 52a. However, the disposition of the connection passages 60 is not limited thereto. For example, the connection passages 52a may be used as the connection passages 60 by forming the connection passages 52a up to the lower end of the coolant inlet manifolds 22a with predetermined intervals therebetween.

With the embodiment of the present invention, it is preferable that the coolant channel has a shape that allows, after the coolant has been introduced from the pair of coolant inlet manifolds convergently inward in the lateral direction, the coolant to flow in the longitudinal direction, to flow divergently outward in the lateral direction, and to be discharged through the pair of coolant outlet manifolds.

It is preferable that the grooves have a wave shape and a direction of inclination of one side of the wave shape be the same as or parallel to a flow direction of the inclined coolant channel.

According to the embodiment of the present invention, the downstream ends of the inclined coolant channel are connected to the downstream center of the coolant channel and the upstream ends of the inclined coolant channel are connected to the coolant inlet manifolds, and the inclined coolant channel extends diagonally inward with respect to the longitudinal direction. Thus, the coolant, which is supplied through the coolant inlet manifold to the coolant channel, is smoothly and sufficiently supplied to the downstream center of the coolant channel through the inclined coolant channel.

Therefore, in particular, the downstream center of the coolant channel, where the temperature of the electricity-generating surface easily rises, can be reliably cooled. As a result, the temperature distribution can be made uniform over the entire area of the electricity-generating surface by using a simple structure, whereby the electricity-generating performance can be easily increased.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising a stack of electrolyte electrode assemblies and metal separators, each of the electrolyte electrode assemblies comprising an electrolyte and a pair of electrodes sandwiching the electrolyte between the pair of electrodes, each of the metal separators having a rectangular shape, and each of the metal separators having a fuel gas inlet manifold and an oxidant gas inlet manifold formed at one end of each of the metal separators in a longitudinal direction, the fuel gas inlet manifold and the oxidant gas inlet manifold respectively allowing a fuel gas and an oxidant gas before use to flow in a stacking direction, a fuel gas outlet manifold and an oxidant gas outlet manifold formed at another end of each of the metal separators in the longitudinal direction, the fuel gas outlet manifold and the oxidant gas outlet manifold respectively allowing the fuel gas and the oxidant gas after use to flow in the stacking direction, and a pair of coolant inlet manifolds and a pair of coolant outlet manifolds formed at both ends of each of the metal separators in a lateral direction, the pair of coolant inlet manifolds being disposed adjacent to the fuel gas inlet manifold and the oxidant gas inlet manifold, the pair of coolant inlet manifolds being disposed on the one end in the longitudinal direction and being configured to allow a coolant before use to flow in the stacking direction, the pair of coolant outlet manifolds being disposed adjacent to the fuel gas outlet manifold and the oxidant gas outlet manifold, the pair of coolant outlet manifolds being disposed on the another end in the longitudinal direction and being configured to allow the coolant after use to flow in the stacking direction, the fuel cell comprising:

a fuel gas channel having a wave shape formed in one surface of a first metal separator of the metal separators so as to extend in the longitudinal direction, the one surface facing one electrode of the pair of electrodes of each of the electrolyte electrode assemblies, the fuel gas channel connecting the fuel gas inlet manifold to the fuel gas outlet manifold;

an oxidant gas channel having a wave shape formed in another surface of a second metal separator of the metal separators so as to extend in the longitudinal direction, the second metal separator being adjacent to the first metal separator, the another surface facing another electrode of the pair of electrodes of each of the electrolyte electrode assemblies, the oxidant gas channel connecting the oxidant gas inlet manifold to the oxidant gas outlet manifold; and a coolant channel formed between the first and second metal separators that are adjacent to each other to allow the coolant to flow through the coolant channel, the coolant channel having grooves formed on a back side of the fuel gas channel and grooves formed on a back side of the oxidant gas channel, wherein the coolant channel comprises an inclined coolant channel group in which overlapping portions of the grooves facing each other are connected along flow of the coolant that is oriented diagonally inward with respect to the longitudinal direction, wherein the inclined coolant channel group comprises inclined coolant channels whose downstream ends are connected to a downstream center of the coolant channel and whose upstream ends are connected to the coolant inlet manifolds, and wherein the coolant is introduced from the pair of coolant inlet manifolds, and is discharged through the pair of coolant outlet manifolds.

2. The fuel cell according to claim 1, wherein the grooves have a wave shape and a direction of inclination of one side of the wave shape is same as or parallel to a flow direction of the inclined coolant channel.

* * * * *